United States Patent [19]

Sells et al.

[11] Patent Number: 4,926,838
[45] Date of Patent: May 22, 1990

[54] CHARCOAL GRILLING UNIT

[75] Inventors: Charles C. Sells, Mt. Juliet; Robert N. Martin, Brentwood, both of Tenn.

[73] Assignee: Sportsman's Market, Inc., Batavia, Ohio

[21] Appl. No.: 345,195

[22] Filed: Apr. 28, 1989

[51] Int. Cl.$^5$ .......................... A47J 37/00; F24B 3/00
[52] U.S. Cl. ................... 126/25 A; 126/25 R; 126/147; 99/340; 99/393; 99/339
[58] Field of Search ............ 126/25 R, 25 A, 25 AA, 126/41 R, 154, 276, 147; 99/443, 339, 345, 340, 393, 421 H, 445

[56] References Cited

U.S. PATENT DOCUMENTS

| | | | |
|---|---|---|---|
| 2,386,815 | 10/1945 | Rubenstein | 126/25 A |
| 2,477,529 | 7/1949 | Sprinkle et al. | 126/9 R |
| 2,507,243 | 5/1950 | Boyd et al. | 126/25 A |
| 2,582,720 | 1/1952 | Roberts | 126/25 A |
| 2,867,165 | 1/1959 | Money | 99/423 |
| 2,900,897 | 8/1959 | Fisher | 126/25 A |
| 2,961,942 | 11/1960 | Terry | 99/340 |
| 3,088,395 | 5/1963 | Miller | 99/340 |
| 3,101,080 | 8/1963 | Lorbacher | 126/25 A |
| 3,124,057 | 3/1964 | Kiser | 126/9 R |
| 3,358,585 | 12/1967 | Scherer | 99/340 |
| 3,503,324 | 3/1970 | Gmeiner | 99/393 |
| 3,789,748 | 2/1974 | Rappoport et al. | 99/340 |
| 3,943,837 | 3/1976 | Trkla | 126/25 A |
| 4,106,473 | 8/1978 | Wandel | 126/25 R |
| 4,158,992 | 6/1979 | Malafouris | 99/339 |
| 4,321,857 | 3/1982 | Best | 99/340 |
| 4,462,306 | 7/1984 | Eisendrath | 126/25 A |
| 4,572,062 | 2/1986 | Widdowson | 126/25 A |
| 4,592,335 | 6/1986 | Beller | 126/25 A |
| 4,627,410 | 12/1986 | Jung | 126/25 A |
| 4,690,125 | 9/1987 | Beller | 126/25 A |

Primary Examiner—James C. Yeung
Attorney, Agent, or Firm—Wood, Herron & Evans

[57] ABSTRACT

A grilling unit for cooking or roasting large quantitites of food items at a single time is described. The unit employs a grilling surface positioned on a grid frame which is continuously adjustable by means of a bevel gear transmission. Roasting of food items is accomplished by use of a rotisserie unit.

15 Claims, 1 Drawing Sheet

CHARCOAL GRILLING UNIT

FIELD OF THE INVENTION

This invention relates to a charcoal grilling unit for grilling large quantities of individual pieces of meat or other food items at a single time, or alternatively, for roasting large quantities of meat or other food items on a spit rotated by a rotisserie unit.

BACKGROUND OF THE INVENTION

Charcoal grilling units have been used for many years to cook meats and other food items. For those units used outdoors employing charcoal or other similar fuel source, the typical grilling unit consists of a fuel bed to retain the charcoal and a grilling surface located above the heated charcoal embers upon which the meat or other food item is cooked. Optionally, the grilling units may include a spit located above the fuel source, rotatable by hand or by electric motor, upon which individual portions of meat or other food items are placed for roasting.

The grilling surface of grilling units are traditionally made from metal, which is durable and provides excellent heat conduction. Unfortunately, the heat conduction properties of the metal make hand adjustment of the grilling surface difficult after heating has begun because of the high temperatures of those surfaces to be adjusted. This problem of height adjustment is further compounded by the combined weight of the grilling surface and the food items to be cooked. As the combined weight increases, the grilling surface height adjustment becomes more difficult. Also, the support members for the typical grilling units are not designed to accommodate large pieces of meat, for example, weighing several hundred pounds.

SUMMARY OF THE INVENTION

The invention relates to an outdoor grill for cooking food having a grid surface connected to a bevel gear transmission which permits continuous adjustment over the entire height range of the grid frame. The bevel gear transmission is remote from the grid surface, thereby permitting adjustment without the direct danger of the operator suffering a burn injury. The bevel gear transmission allows continuous adjustment of the grid surface, and further has the capacity of adjusting grid surfaces of large size, which in combination with the cooking food items comprises a substantial amount of weight.

It is therefore an object of this invention to provide a grilling unit having a grilling surface continuously adjustable by a single person.

It is a further object to provide a grilling unit having a grilling surface which is adjustable by hand with minimal risk of receiving a direct burn from the adjustment mechanism.

It is yet a further object to provide a grilling unit which can cook or roast large quantities and weights of meat or other food items at one time.

These and other objects and advantages are described in more detail below. The invention in its broader aspects is depicted in several drawings, in which:

DETAILED DESCRIPTION OF THE INVENTION

The invention in its broader aspects relates to an outdoor grill for cooking relatively large quantities of food at one time on a grid surface comprising a fuel bed, a plurality of vertical support members to maintain the fuel bed a distance above the ground and approximately parallel to the ground, a grid frame having terminus plates at opposite ends thereof, the frame being positioned above the fuel bed, a bevel gear transmission attached to the fuel bed, a plurality of drive shafts drivably connected to the bevel gear transmission and to the terminus plates for adjusting the height of the grid frame, and a grid surface mounted on the grid frame. In a preferred embodiment of the invention, each drive shaft connected to the bevel gear transmission is externally threaded. It is also preferred that the bevel gear transmission be drivably connected to each threaded drive shaft by a bevel gear drive. Most preferably, each bevel gear drive is internally threaded to match the externally threaded drive shaft and thereby transmit force from the transmission to the grid frame.

To maintain the grid frame on a plane relatively parallel to the fuel bed as the frame height is adjusted, it is preferred that at least one stabilizer post be attached to each terminus plate and slidably connected to the fuel bed, preferably using a stabilizer guide. In the version of the grilling unit described hereinbelow, each terminus plate had two stabilizer posts attached thereto, the posts flanking the drive shaft.

To permit additional flexibility in operation of the grilling unit, and further to simplify fuel loading and subsequent cleaning of the grid upon which the food is cooked, it is preferred that the grid surface be comprised of at least two grid sections. In the version depicted hereinbelow, the grid surface was comprised of four rectangular grid sections which were individually removable from the grid frame.

Large sections of meat or other food items may be roasted using the grilling unit by positioning a rotisserie unit onto the grid frame, with optional removal of the individual grid sections. The rotisserie unit, consisting preferably of a spit mounted on a frame and driven by an electric motor, may be used for impaling food items such as a whole pig, a side of beef, a quantity of whole chickens, or the like, for roasting at one time. Alternatively, the spit may be driven by hand cranking or spring-powered drive means.

Figure 1:
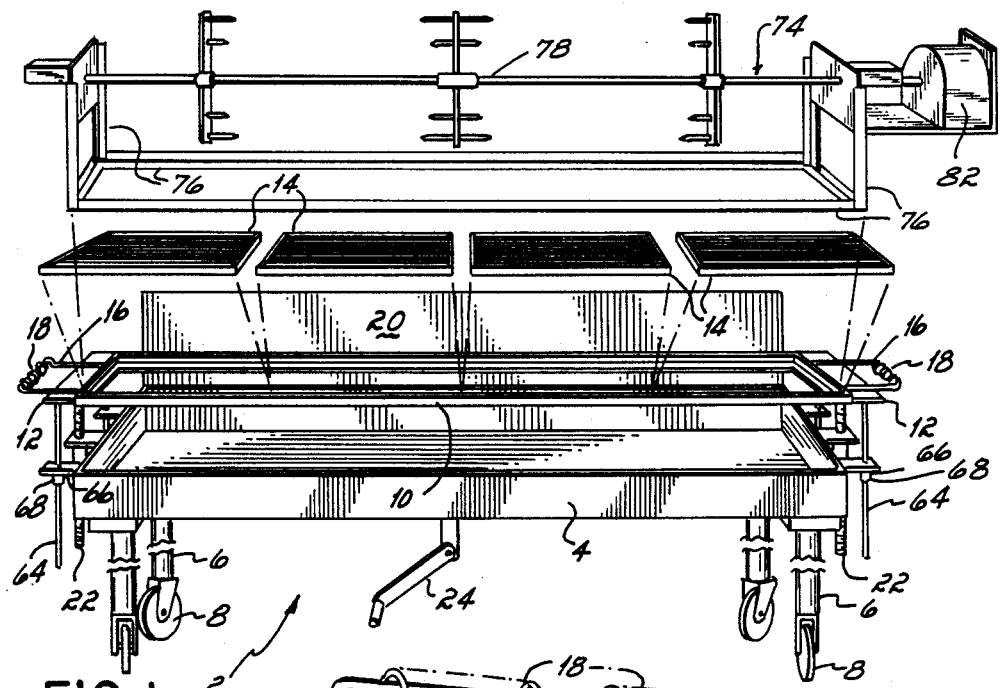
FIG. 1 is a perspective view of the front of the grilling unit, depicting in exploded view the grid sections of the grilling unit and the optional rotisserie unit for use in roasting.

Referring to the drawings, in FIG. 1 the grilling unit 2 is comprised of the fuel bed 4, which is supported on vertical legs 6, preferably connected to individual casters 8. Located above the fuel bed 4 is the grid frame 10 integrally connected to terminus plates 12, preferably by welding. The fuel bed 4 was manufactured from 12 gauge hot rolled steel.

The grid frame 10, manufactured also from hot rolled steel, has an angled configuration onto which is positioned the grid surface for cooking the meats or other food items. Preferably, the grid surface consists of several grid sections 14 produced from porcelainized steel which are removable to permit cleaning of the section 14 or fuel bed 4, for placement of fuel into the fuel bed 4, or roasting of food items with the rotisserie unit. Connected to the grid frame 10 and terminus plates 12, preferably by welding, are handles 16 to which are optionally added heat dissipating coils 18 made from spring steel which is subsequently chrome plated. The handles 16 are used for moving the entire grilling unit 2 into position for cooking. Though two handles, both with heat dissipating coils, are depicted for positioning purposes, it can be appreciated that the grilling unit may have only one handle, or even no handles. Behind the rear side of the grid frame 10 is a back plate 20 removably connected to the fuel bed 4 which serves to concentrate heat at the grid surface and also to act as a splash guard.

The height of the grid frame 10 above the fuel bed 4 is adjusted by the rotation of stainless steel drive shafts 22 located at either end of the fuel bed 4 and connected to the underside of terminus plates 12. Adjustment is effected by rotating crank 24 at the front end of the grilling unit 2, below the fuel bed 4.

Figure 2:
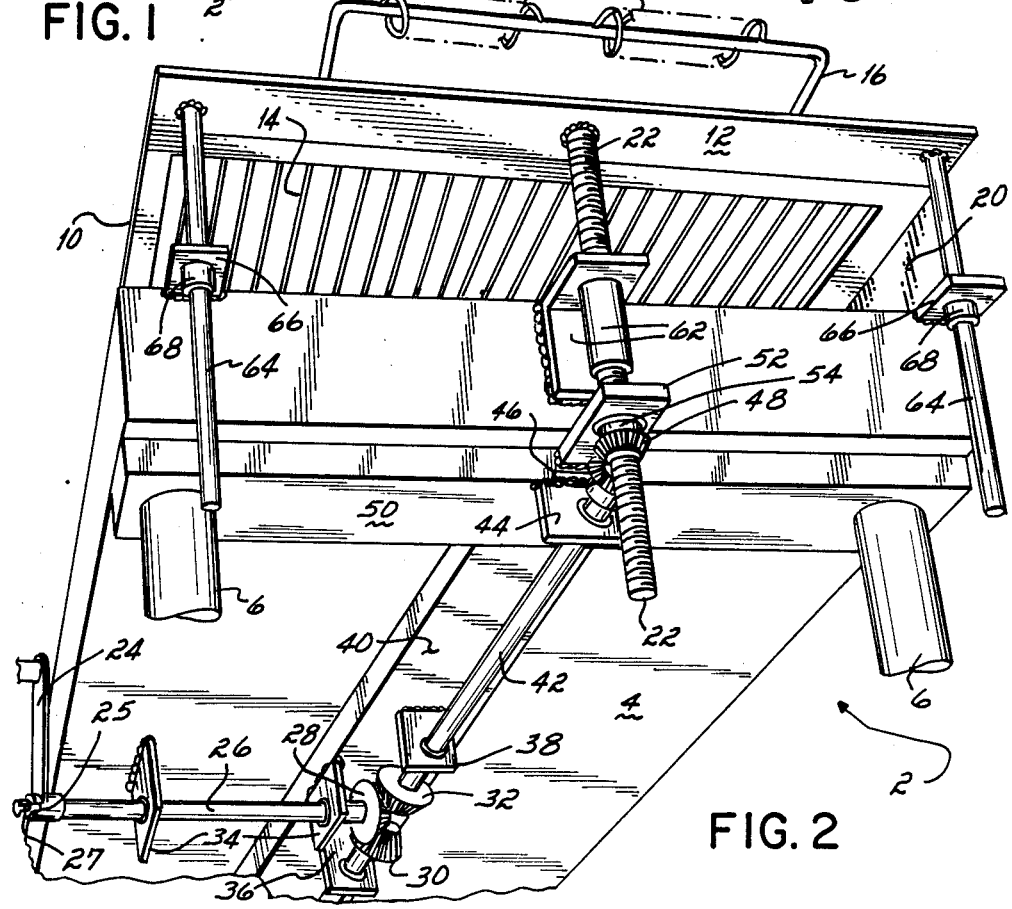
FIG. 2 is a fragmentary perspective view of the side and undercarriage of the grilling unit, wherein one side of the bevel gear power transmission mechanism is shown.

Referring to FIG. 2, it can be seen that a clockwise rotation of the crank 24 causes clockwise rotation through crank shaft 26 of crank bevel gear 28. This movement in turn causes rotation of the left shaft bevel gear 30 and right shaft bevel gear 32, both of which are positioned to engage the crank bevel gear 28. As viewed from a center position between shaft bevel gears 30 and 32 outward toward the ends of the grilling unit 2, clockwise rotation of crank 24 effects in turn a clockwise rotation of both left shaft bevel gear 30 and right shaft bevel gear 32. The gears are maintained in a meshing relationship by crank shaft support members 34, left shaft support member 36, and right shaft support member 38, which are preferably fixed in place by welding onto either the fuel bed 4 or longitudinal support brace 40, which preferably is hollow. The crank 24 is shown in FIG. 2 at the end of crank shaft 26 positioned to effect rotation of the crank shaft 26. It is preferred that the crank 24 be freely slidable along crank shaft 26 to allow for positioning of the crank safely under the fuel bed 4 after adjustment is complete. Rotation of the crank shaft 26 is accomplished by moving the crank 24 to the end thereof, and positively engaging the crank shaft 26 at a key 27 by a slot 25 on the crank 24.

FIG. 2 illustrates the right hand side of the grilling unit 2 but it should be understood that the left side is constructed substantially identically, with the possible exception of the placement of a handle 16. As shown in FIG. 2, the right connecting rod 42 is inserted through the rod support member 44 and capped with a bevel gear 46. Attachment of the bevel gears to the various smooth shafts and connecting rods used in the grilling unit 2 is accomplished by use of set screws. Bevel gear 46 is positioned in meshing relationship to the bevel drive gear 48, which is internally threaded and maintained in fixed relation to the transverse support brace 50 by the drive gear support member 52, which is preferably welded to the support brace 50. The transverse support brace 50 preferably is hollow. The bevel drive gear 48 rotates freely in relation to the drive gear support member 52 through connection to the hub 54, which rotates relative to the drive gear support member 52 on a brass bushing (not shown).

Rotation of the bevel gear 46 causes a corresponding rotation of the bevel drive gear 48. The internal threading of bevel drive gear 48, not shown, meshes with the threading of the stainless steel drive shaft 22 which is secured at one end to terminus plate 12 and runs through drive shaft guide 62 which is secured to fuel bed 4, preferably by welding. The drive shaft 22 may be secured to the terminus plate 12 by a variety of means, such as by set screws, locking nuts, welds (as depicted in FIG. 2), or the like. The rotation of bevel drive gear 48, working essentially as a fixed nut, causes relative movement of the internal threading of the bevel drive gear to the drive shaft 22, resulting in height adjustment of the grid frame 10. In the embodiment as shown the height of the grid frame is continuously adjustable over a 9 inch range, beginning from a point directly above the lip of the fuel bed 4.

Further stabilization of the grid frame 10 is accomplished by use of stainless steel stabilizer posts 64, which are secured to the terminus plate 12 and freely slide through stabilizer guides 66 which are preferably lined with brass bushings 68. As with drive shaft 22, the stabilizer posts 64 may be secured to the terminus plate 12 by set screws, locking nuts, welds (as depicted in FIG. 2), or the like. The stabilizer guides 66 are secured, preferably by welding, to the fuel bed 4.

The height adjustment mechanism at the left side of the grilling unit 2 is identical to that described above for the right side. Thus, rotation of the crank 24 effects simultaneous movement of bevel drive gears at both ends of the grilling unit, effecting height adjustment to the same degree at each terminus plate 12 of the grilling unit 2. All gear ratios and thread sizes for the right portion of the height adjustment mechanism are identical to those found on the left side of the grilling unit. Bevel gears are produced preferably from mild steel. The connecting rods are produced preferably from cold rolled steel.

In FIG. 1, an alternate use of the grilling unit 2 is shown wherein large pieces of meat may be roasted by the use of a rotisserie unit. The rotisserie unit 74 consists of a support frame 76, a spit 78, and means to rotate the spit, in this case an electric motor 82. The rotisserie unit 74 lies on the grid frame 10. If other items are to be cooked in addition to the food on the spit, one or more grid sections 14 may be positioned above the support frame 76.

The grilling unit described above has been used preferably for cooking large quantities of food at a single time. The version of the grilling unit herein described had four grid sections, each with a dimension of 15"×23¼", resulting in a grilling surface of about 10 square feet. The spit 78 of the rotisserie unit as depicted above had a usable length of 60¼" and in the version herein described was produced from ¾ inch stainless steel. The support frame 76 adds 10 inches to the height of the spit 78 above the grid frame 10. The height adjustment feature, which permits adjustment to any height within the range of 0 to 9 inches above the lip of the fuel bed 4 allows more control of the cooking process, thereby permitting improved grilled or roasted food items. However, it can be seen that only a portion of the fuel bed need be loaded with fuel, and only a portion of the total grid surface need be employed for cooking purposes, thus permitting the grilling or roasting of smaller quantities of food items.

Thus, it is apparent that there has been provided, in accordance with the invention, a grilling unit that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An outdoor grill for cooking relatively large quantities of food at one time on a grid surface, comprising:
   a fuel bed;
   a plurality of vertical support members to maintain said fuel bed a distance above the ground and approximately parallel thereto;
   a grid frame having terminus plates at opposite ends thereof, said frame positioned above said fuel bed;
   a bevel gear transmission attached to said fuel bed and actuable by a crank, said transmission comprising a crank-connected bevel gear which meshes with two shaft bevel gears, said shaft bevel gears rotating in opposed directions in response to rotation of said crank-connected bevel gear;
   a plurality of driveshafts driveably connected to said shaft bevel gears of said bevel gear transmission and to said terminus plates for adjusting the height of said grid frame; and
   a grid surface mounted on said grid frame.

2. The apparatus of claim 1 wherein each said drive shaft is externally threaded.

3. The apparatus of claim 2 wherein said bevel gear transmission is driveably connected to each said threaded driveshaft by a bevel gear drive.

4. The apparatus of claim 3 wherein said bevel gear transmission is connected to each said threaded driveshaft by one bevel gear of said bevel gear drive having internal threading matching said threaded driveshaft and engaged thereto.

5. The apparatus of claim 1 wherein each said terminus plate has at least one stabilizer post attached thereto, said post slidably connected to said fuel bed.

6. The apparatus of claim 5 wherein said stabilizer post is connected to said fuel bed by a stabilizer guide attached to said fuel bed.

7. The apparatus of claim 6 having two said stabilizer posts attached to each said terminus plate, said posts flanking said driveshaft.

8. The apparatus of claim 1 wherein said grid surface is comprised of at least two grid sections.

9. The apparatus of claim 8 wherein said grid sections are removable from said grid frame.

10. An outdoor grill for cooking relatively large quantities of food at one time on a grid surface, comprising:
    a rectangular fuel bed having a long and a short dimension;
    support legs for said fuel bed secured thereto to maintain said fuel bed a distance above the ground and approximately parallel thereto;
    a rectangular grid frame having dimensions approximately equal to said fuel bed with two terminus plates connected thereto at opposite ends thereof along the short dimension of said frame and extending beyond the dimensions of said fuel bed;
    a bevel gear transmission attached to said fuel bed and actuable by a crank, said transmission comprising a crank-connected bevel gear which meshes with two shaft bevel gears, said shaft bevel gears rotating in opposed directions in response to rotation of said crank-connected bevel gear;
    threaded driveshaft disposed vertically below each said terminus plate and connected thereto at a fixed point;
    force transferring means connecting said bevel gear transmission to each said threaded driveshaft;
    a pair of stabilizer posts connected to each said terminus plate and flanking said threaded driveshaft, each said post slidably connected to said fuel bed by a guide mounted to said fuel bed; and
    a grid surface mounted on said grid frame for supporting quantities of food.

11. The apparatus of claim 10 wherein said force transferring means comprises a bevel gear drive, one gear thereof having internal threading matching each said threaded drive shaft and engaged thereto.

12. The apparatus of claim 10 wherein each said threaded driveshaft is slidably connected to said fuel bed by a guide mounted to said fuel bed.

13. The apparatus of claim 10 wherein said grid surface is comprised of at least two grid sections.

14. The apparatus of claim 10 wherein at least one said grid section is removable from said grid frame.

15. An outdoor rotisserie for cooking relatively large quantities of food comprising:
    a rectangular fuel bed having a long and a short dimension;
    support legs for said fuel bed positioned at the four corners thereof to maintain said fuel bed a distance above the ground and approximately parallel thereto;
    a rectangular grid frame having dimensions approximately equal to said fuel bed with two terminus plates connected thereto at opposite ends thereof along the short dimension of said frame and extending beyond the dimensions of said fuel bed;
    a bevel gear transmission attached to said fuel bed and actuable by a crank, said transmission comprising a crank-connected bevel gear which meshes with two shaft bevel gears, said shaft bevel gears rotating in opposed directions in response to rotation of said crank-connected bevel gear;
    a threaded driveshaft disposed vertically below each said terminus plate and connected thereto at a fixed pivot point;
    connecting rods connecting said drive gears of said bevel gear transmission to each said threaded driveshaft;
    a pair of stabilizer posts connected to each said terminus plate and flanking said threaded driveshaft, each said post slidably connected to said fuel bed by a guide mounted to said fuel bed;
    a split mounted on said grid frame; and
    drive means to rotate said spit.

* * * * *